United States Patent [19]

Jack et al.

[11] Patent Number: 5,167,769

[45] Date of Patent: Dec. 1, 1992

[54] PARTICLE LEVEL SENSOR

[75] Inventors: J. Stewart Jack, Pointe Claire; Thomas O. Gonzalez, Hudson; Anthony P. Holko, Beaconsfield; Namir Sayegh, Montreal, all of Canada

[73] Assignee: Pulp and Paper Research Institute of Canada, Pointe Claire, Canada

[21] Appl. No.: 612,929

[22] Filed: Nov. 14, 1990

[51] Int. Cl.⁵ .................................................. D21C 7/12
[52] U.S. Cl. ................................... 162/238; 162/263; 210/744; 210/746; 210/800; 422/82.02; 436/150
[58] Field of Search ................. 162/49, 198, 238, 263; 210/744, 746, 800; 73/304 R; 422/62, 105, 82.02, 82.01; 436/150, 151

[56] References Cited

U.S. PATENT DOCUMENTS 4,221,532  9/1980  Loe, Jr. ................................. 162/49
4,554,051  11/1985  Danforth ............................. 162/49

FOREIGN PATENT DOCUMENTS 1154622  10/1983  Canada ............................... 162/238

OTHER PUBLICATIONS

Rydholm "Pulping Processes", Interscience Publishers, N.Y., Sep. 1967: p. 799.
"The Distribution of Porosity in Filter Cakes", R. L. Baird et al, Proceedings of the Filtration Society, Manchester on Mar. 21, 1967, Filtration & Separation Sep.-/Oct. 1967, pp. 471 to 476.
American Chemical Society Conference Proceedings, Int. Symp. Water Filtration Editor, Weiler, R. A. Jawssens, J. G., 1982, "The Use of Electrical Conductivity Measurements to Elucidate the Theory of Gravity Thickening", Wakeman et al.
Proceedings EUCEPA Symposium May 11–14, 1982, Stockholm, Sweden. "Control Systems in the Pulp and Paper Industry", State of the Art in Continuous Digester Control S. O. Lundqvist et al, pp. 99–108.
Tappi, vol. 54, No. 3, Mar. 1971, pp. 368–371, R. E. Fuchs et al.
AIChE Journal, vol. 36, No. 7, Jul. 1990, pp. 1075 to 1086, B. J. Allison et al "Adaptive-Predictive Control of Kamyr Disgester Chip Level".
"Adaptive-Predictive Control of Kamyr Digester Chip Level: Industrial Results", B. J. Allison et al, 1990 Annual Meeting, pp. A275–A284.
Proceedings EUCEPA Symposium May 11–14, 1982, Stockholm, Sweden. "Kappa Number Control of Kamyr Digesters" pp. 116–125.
Proceedings EUCEPA Symposium May 11–14, 1982, Stockholm, Sweden. D. F. Church et al, pp. 126–133, "Survey on Sensor Availability and Sensor Developments for Continuous Digester Control".
Technical Section, 72nd Annual Meeting "Update 1986 The Kamyr Digester 1957–1985 What We Have Lerned".
Adaptive Filter Theory, S. Haykin, Prentice-Hall, pp. 67–76.
Rev. Sci. Instrum. 51(4) Apr. 1980, K. R. Walton, pp. 504–508, "Sensor for the Measurement of the Level and Volume of Conductive Liquids".

Primary Examiner—Steve Alvo
Attorney, Agent, or Firm—Swabey Ogilvy Renault

[57] ABSTRACT

A sensor for the detection of wood chip level in a digester, for example, a Kamyr digester, which consists of: (a) a probe, several meters long, vertically mounted inside the top part of the digester; (b) a series of bare metal electrodes in the side of the probe, spaced typically a few centimeters apart, and electrically insulated from the probe wall; (c) electronic circuit processing to allow any pair of electrodes to be selected, and (c) a means to allow the electrical properties of a liquor or wood chip and liquor mixture between the electrodes of a pair to be measured, and the level deduced from the measurement.

5 Claims, 12 Drawing Sheets

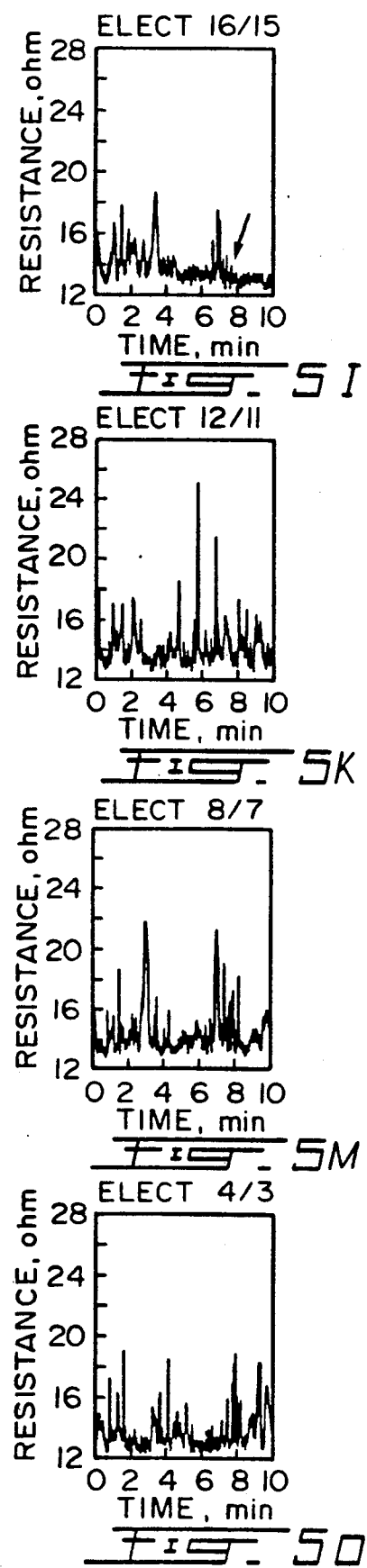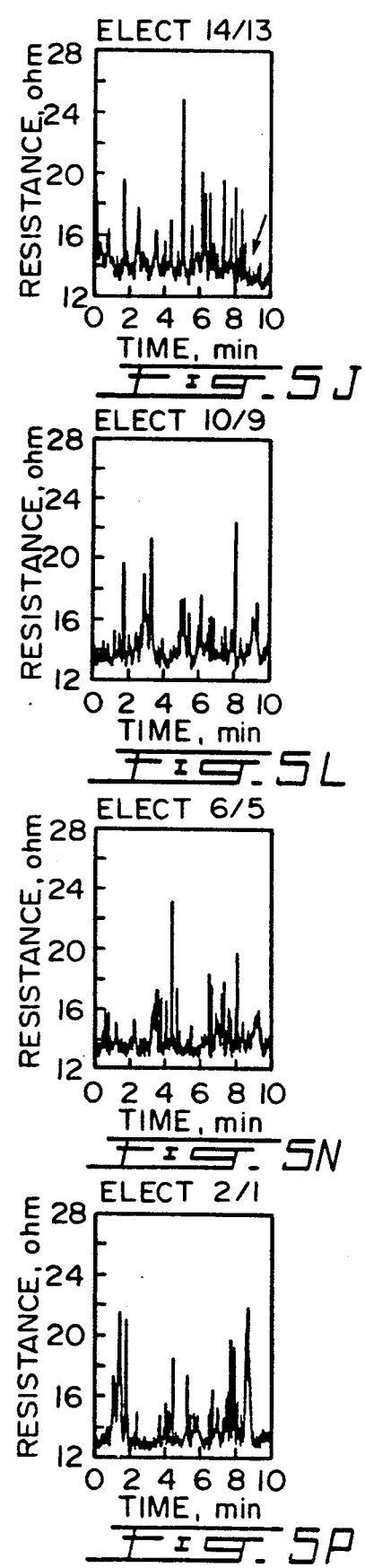
FIG. 5I  FIG. 5J  FIG. 5K  FIG. 5L  FIG. 5M  FIG. 5N  FIG. 5O  FIG. 5P

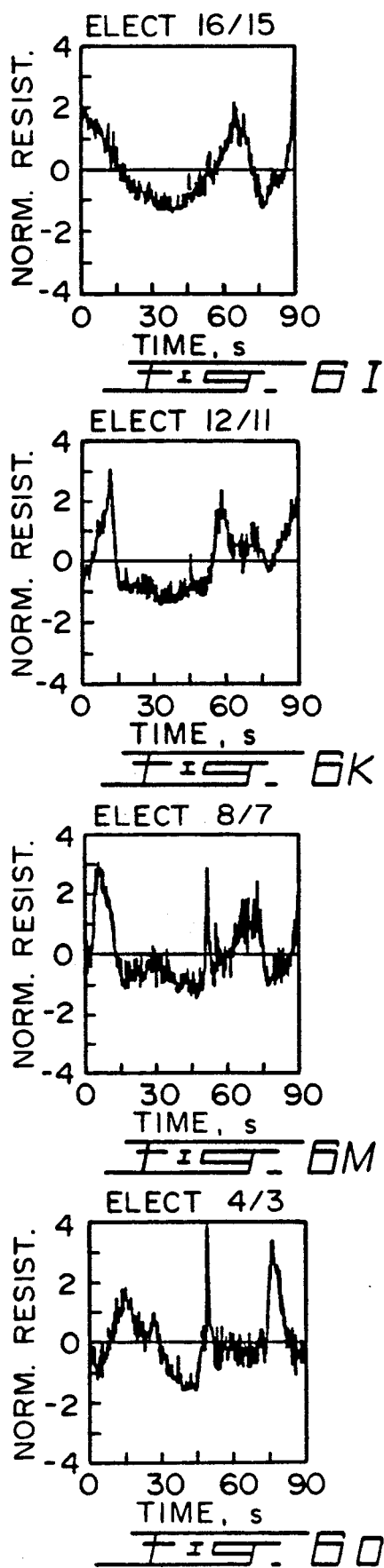
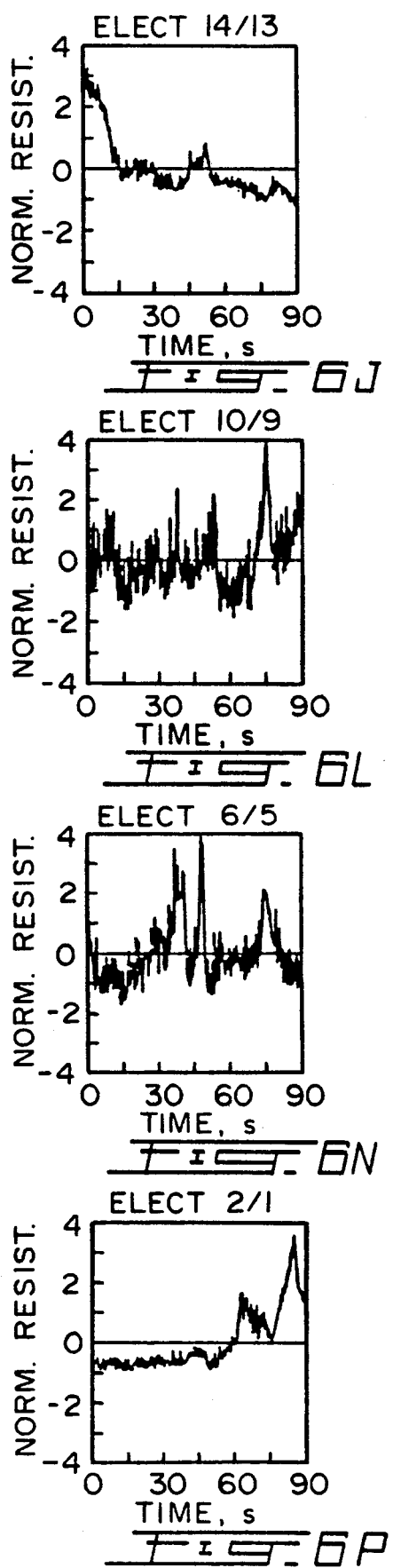
FIG. 6I  FIG. 6J
FIG. 6K  FIG. 6L
FIG. 6M  FIG. 6N
FIG. 6O  FIG. 6P

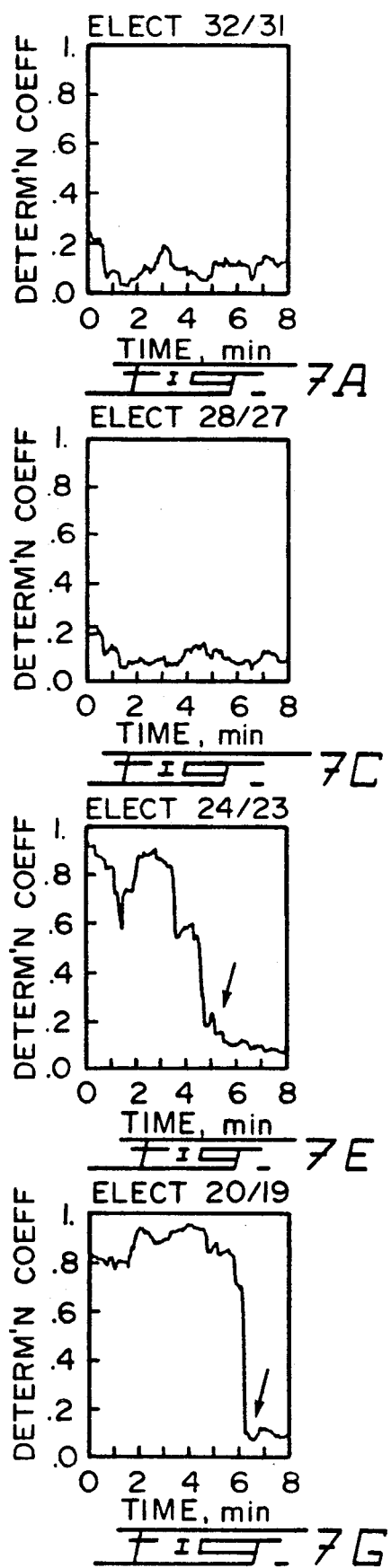
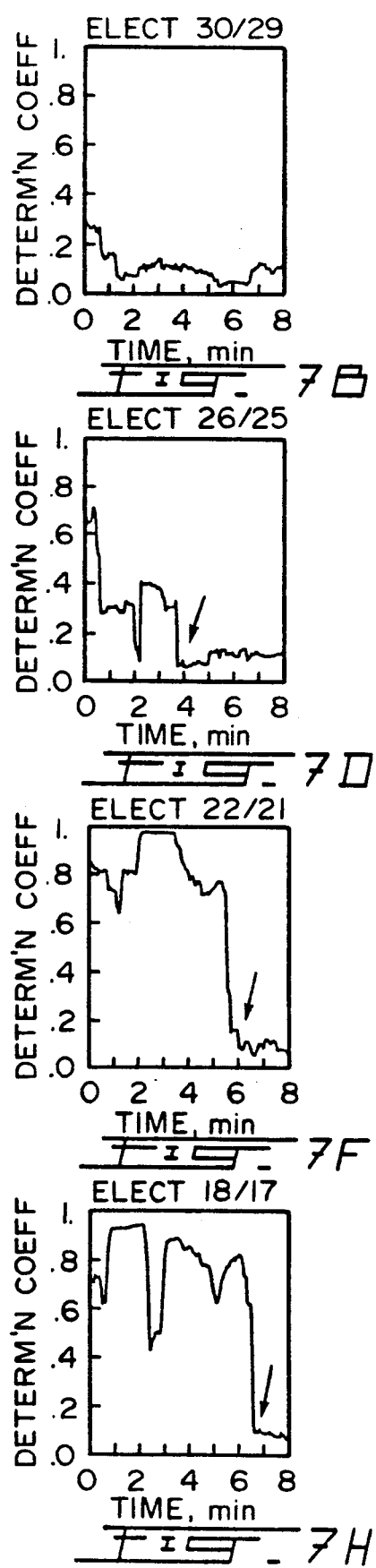

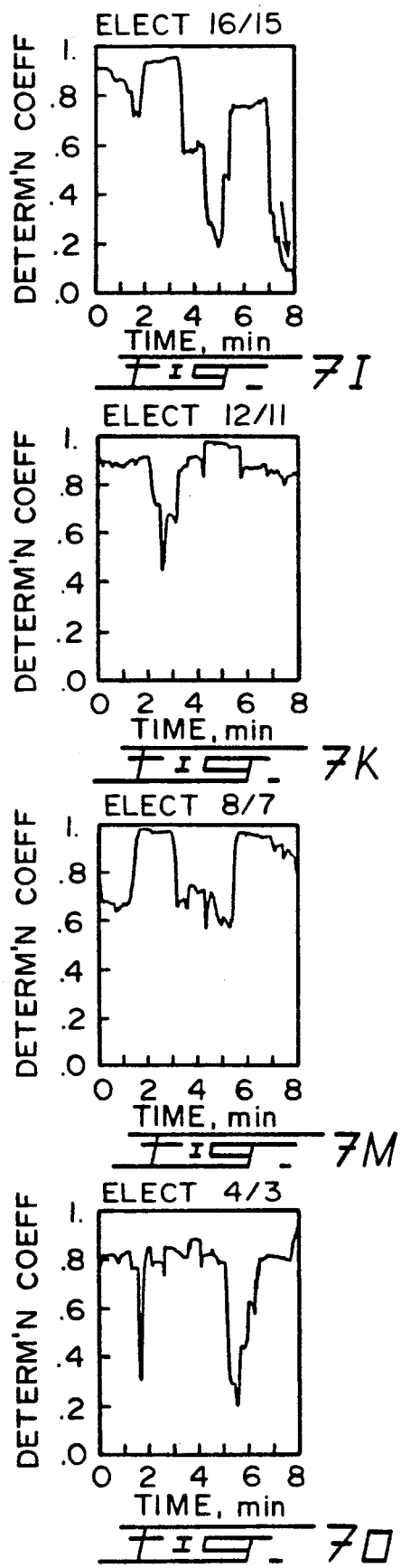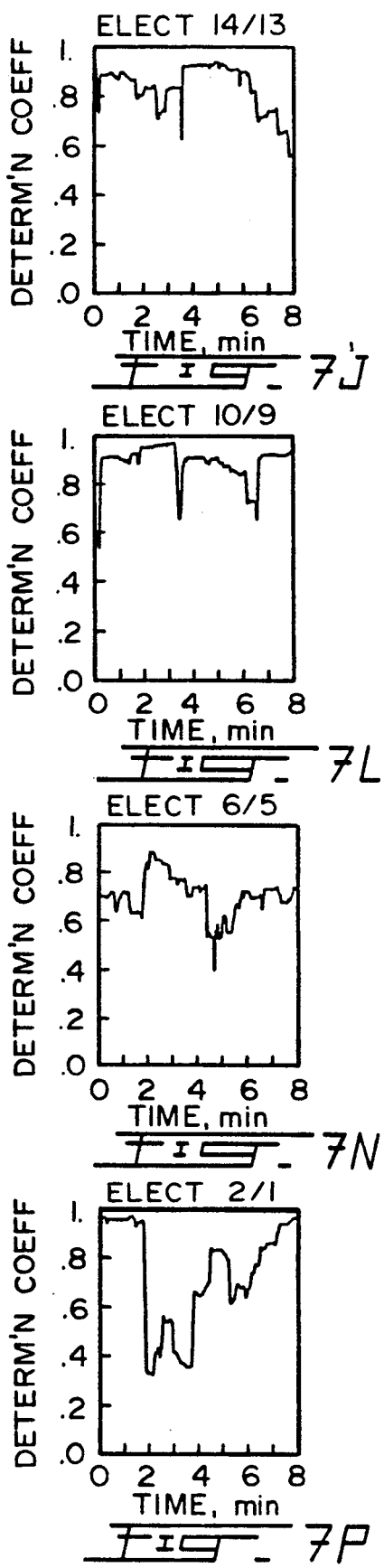
FIG. 7I  FIG. 7J  FIG. 7K  FIG. 7L  FIG. 7M  FIG. 7N  FIG. 7O  FIG. 7P

PARTICLE LEVEL SENSOR

BACKGROUND OF THE INVENTION

1) Field of the Invention

The present invention relates to a method for detecting or measuring the particle level in a flow of particles in a liquid medium; the invention is more especially concerned with a method for detecting or measuring the wood chip level in a flow of wood chips in a continuous chip digester, impregnation vessel, clarifier or other such vessel; the invention also relates to a sensor for detecting or measuring the level of particles in a liquid in a vessel, for example, wood chips in a continuous chip digester.

ii) Description of Prior Art

In the operation of a continuous kraft pulp digester, the mixture of wood chips and sluicing liquor enters the digester via the top separator. The liquor is extracted through screens in the separator, and the chips fall freely in the cooking liquor until they reach the slow moving column of packed chips occupying the bulk of the vessel. The chip level in the digester, i.e., the location of the interface between the free-falling chips and the packed chips, directly influences the chip residence time, and hence, the final Kappa number. Control of the chip level, therefore, constitutes one of the more important digester control loops. (Lundqvist, S.O., "State of the Art in Continuous Digester Control", EUCEPA Symposium, Stockholm, May 1982, page 99, and Granberg, B. and Gustavsson, I., "Kappa Number Control of Kamyr Digesters", EUCEPA Symposium, Stockholm, May 1982, page 116.)

Different approaches have been attempted to control the chip level in the digester, ranging from a simple PI regulator acting on the blow flow rate (Fuchs, R. E. and Smith, C. L., "Blow Flow Control of Continuous Digesters", Tappi 54 (3), 368 (1971) to sophisticated adaptive control algorithms, Allison, B. J. Dumont, G. A., Novak, L. H. and Cheetham, W. J., "Adaptive-Predictive Control of Kamyr Digester Chip Level Using Strain Gauge Level Measurements", AIChE Annual Meeting, San Francisco, Nov. 5-10, 1989 and Allison, B. J., Dumont, G. A. and Novak, L. H., "Multi-Input Adaptive-Predictive Control of Kamyr Digester Chip Level: Industrial Results", 76th Annual Meeting, Canadian Pulp & Paper Association, Jan. 30-Feb 2, (1990), p. A275). The success of these schemes has been limited in many cases by the unavailability of adequate instrumentation, especially accurate chip level sensors (U.S. Pat. No. 4,221,632, A. L. Loe).

One indication of chip level has been the top separator motor amperage. To get an indication with this method, however, the digester must be run with a precariously high chip level, which can cause failure of the separator motor (U.S. Pat. No. 4,221,632). Another sensing technique employs three rotating paddles located at different levels below the top separator. The presence of chips is indicated by the extra torque on the paddles. The device, however, has been found to be maintenance intensive. A method using temperature differences to detect chip level is described in U.S. Pat. No. 4,221,632, but is not in general use. Gamma gauges, though used mainly on batch digesters, have been used on some continuous digesters. In addition to concerns about radiation hazards, continuous digester configuration limits their usefulness in most cases to lower chip levels (Church, D. F., "Survey on Sensor Availability and Sensor Development for Continuous Digester Control", EUCEPA Symposium, Stockholm, May 1982, page 126).

The current method for measuring chip level uses three or more independent sensors attached to the walls of the digester at different levels, with the highest just below the top cone. Each sensor consists of a blade set at a right angle to the chip flow, and connected to a strain gauge. The presence of chips causes deflection of the blade which is sensed by the output of the strain gauge. Normally, the chip feed rate is controlled to maintain the chip level between the top two sensors (Roy, R., "Operating Improvements in the Kamyr Digester", The Kamyr Digester—UPDATE 1986, 72nd Annual Meeting, CPPA Technical Section, January 1986). This method, while useful, is not totally satisfactory, since it provides too limited information for control purposes.

SUMMARY OF THE INVENTION

It is an object of this invention to provide a method of detecting the particle level in a downwardly moving flow of particles in an electrically conductive liquid medium.

It is a particular object of the invention to provide such a method in which the particles are wood chips and the liquid medium is a cooking liquor.

It is another object of this invention to provide a kraft digester for wood chips incorporating a sensor for detection of the interface between a free fall region of wood chips and a bed region of wood chips.

It is yet another object of the invention to provide a sensor for detecting the wood chip level in a kraft pulp digester.

A sensing technique has been developed for the detection of particle levels in an electrically conductive fluid medium, for example, a liquid, and more especially chip level in a cooking liquor in a continuous kraft digester, impregnation vessel, or other such vessel. The technique is also applicable to particles, for example, fibres in a liquid medium in a clarifier. The invention is more particularly described by reference to the embodiment in which the particles are wood chips and the liquid medium is a liquor, more especially a cooking liquor. The sensing technique is based on the observation that the presence or movement of chips in the vessel changes the electrical properties of the cooking liquor/chip mixture as measured by a pair of electrodes. When no chips are present, the electrical impedance between the electrodes is proportional to the resistivity of the electrolyte or cooking liquor. The presence or movement of chips directly over either electrode impedes or distorts the flow of electric current between the electrodes, and causes a time varying disturbance in the measured electrical impedance; the characteristics of this disturbance depends upon the nature of the chip movement Loose chips moving at their terminal velocity (i.e., when the gravitational force is balanced by the drag forces) cause rapid short-term changes in the measured impedance. On the other hand, the slow-moving chip bed column results in lower frequency fluctuations in the measured impedance, and is also of a higher amplitude because of more intimate contact with the electrodes.

In accordance with one aspect of the invention typically, the level sensing sensor or probe contains many electrode pairs, typically 50 or more depending on the application. The probe is placed vertically inside the digester so as to be disposed directly in the chip flow. Information on the chip movement at the different levels can be obtained by various methods, for example, by measuring the electrical properties across each electrode pair sequentially. The chip level is then deduced from the region of the electrode pairs where the resistance signals change from those characteristic of free-falling chips to those characteristic of a slow moving bed.

In accordance with one aspect of the invention there is provided a method of detecting the wood chip level in a downwardly moving flow of wood chips having an upper stream of free falling wood chips and a lower bed of wood chips in a cooking liquor, comprising: providing at least a pair of spaced apart electrodes in said flow, allowing electrical current to flow between said electrodes at a plurality of different levels of said flow, evaluating the electrical impedance of said current as a measure of the state of wood chip flow between said electrodes, and determining the wood chip level from the state of wood chip flow at said plurality of different levels.

In particular there is a plurality of electrodes, each being associated with one only of the plurality of levels, and any pair is selectively electrically connected to a source of electric current to develop a flow of current between pairs at the different levels.

In another aspect of the invention there is provided in a continuous kraft pulp digester or similar device having a vessel with an upper free fall region for free fall of wood chips and a lower bed region for housing a downwardly moving bed of wood chips in a cooking liquor, the improvement comprising: a sensor in said vessel for detection of the interface between the free fall region and the bed region, said sensor comprising at least a pair of spaced apart electrodes, means to provide a flow of electrical current between said electrodes, and means to measure the electrical impedance of the electrical current path between said electrodes as a measure of the state of wood chip flow between said electrodes.

In still another aspect of the invention there is provided a sensor for detecting the wood chip level in a continuous kraft pulp digester comprising: an elongate housing having an upper end and a lower end, a plurality of electrodes at an outer surface of said elongate housing, in spaced apart relationship along at least a portion of the longitudinal length of said housing, a plurality of electrically conductive wires within said housing, each wire being in electrical contact with an electrode, said electrically conductive wires being electrically insulated from one another, and having connecting means adapted for electrical connection to a signal processing system.

The electrodes are grouped for sensing purposes in a plurality of pairs and the electrodes within a pair may be in adjacent spaced relationship, or non-adjacent spaced relationship in which they are separated by one or more electrodes of other pairs. Thus any two electrodes can form a pair for sensing purposes and the pairing of individual electrodes may be varied during the course of the sensing.

In addition to determining the level of wood chips in a digester or impregnation vessel, the method of the invention has particular application in determining the level of clarification in a clarification zone of a clarifier in which particles, for example, wood fibres, fall through a liquid medium and collect in a bed.

BRIEF DESCRIPTION OF DRAWINGS

The invention is illustrated in particular and preferred embodiments by reference to the accompanying drawings in which:

FIGS. 6A-6P show the normalized data for the same test as FIGS. 5A-5P;

FIGS 7A-7P show the variation of $r^2$ (coefficient of determination with time for the same test as FIGS. 5A-5P);

DESCRIPTION OF PREFERRED EMBODIMENTS WITH REFERENCE TO THE DRAWINGS

Figure 1:
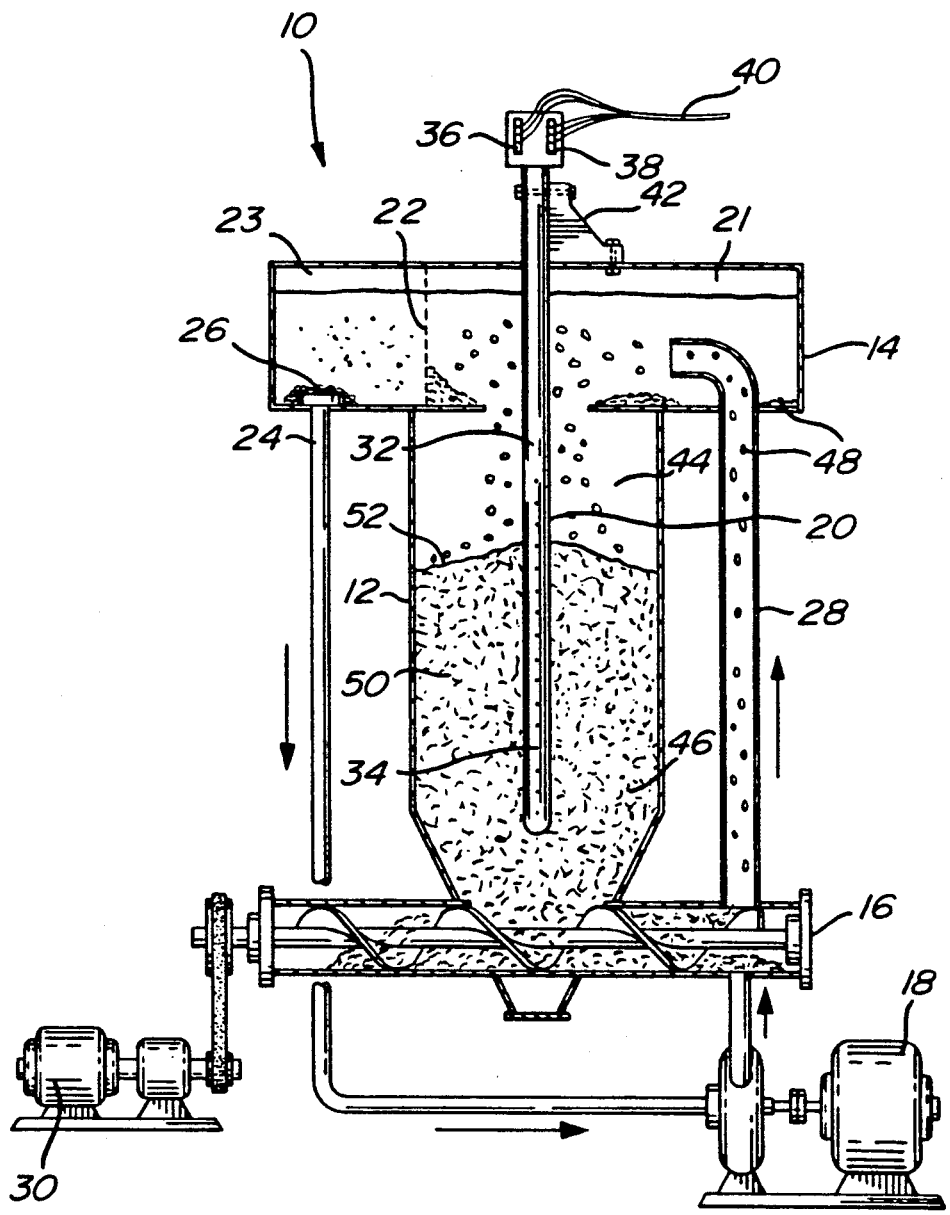
FIG. 1 illustrates schematically a digester simulator for wood chips incorporating a sensor in accordance with the invention.

With further reference to FIG. 1, a pilot-scale chip flow simulator 10 includes a vessel 12, headbox 14, a screw conveyor 16 and a centrifugal pump 18.

A probe 20 of the invention extends vertically into vessel 12.

Headbox 14 has a screen 22 and a downflow conduit 24 communicating with screw conveyor 16. The inlet of downflow conduit 24 has a screen 26.

An upflow conduit 28 communicates screw conveyor 16 with headbox 14.

Screen 22 separates a wood chip/cooking liquor zone 21 from a liquor zone 23 in headbox 14.

Screw conveyor 16 has a drive 30 particularly in the form of a drive and gear box.

Probe 20 has an elongate body 32 and a plurality of spaced apart electrodes 34 at its surface. A pair of terminal strips 36 and 38 at an upper end of probe 20 are connected by an electrical connection 40 to a data acquisition and control system (see FIG. 3).

Wood chips 48 in the simulator 10 form a packed chip bed 50 of a height which is subject to variation with a wood chip level 52 forming the interface between the packed chip bed 50 and the free-falling wood chips 48; in this way an upper free-flow region 44 and a lower bed region 46 are defined in vessel 12.

With further reference to FIGS. 2(a) and (b), the probe 20 has an elongate hollow body 60 with a plurality of electrode housings 68 in an outer wall 69. The housings 68 are of electrical insulation material. A set 64 of electrically conductive wires is housed within the elongate hollow body 60. The set 64 is electrically connected at one end to a data acquisition and control system (see FIG. 3). The free ends of the wires of set 64 are connected to the electrodes 34.

Figure 3:
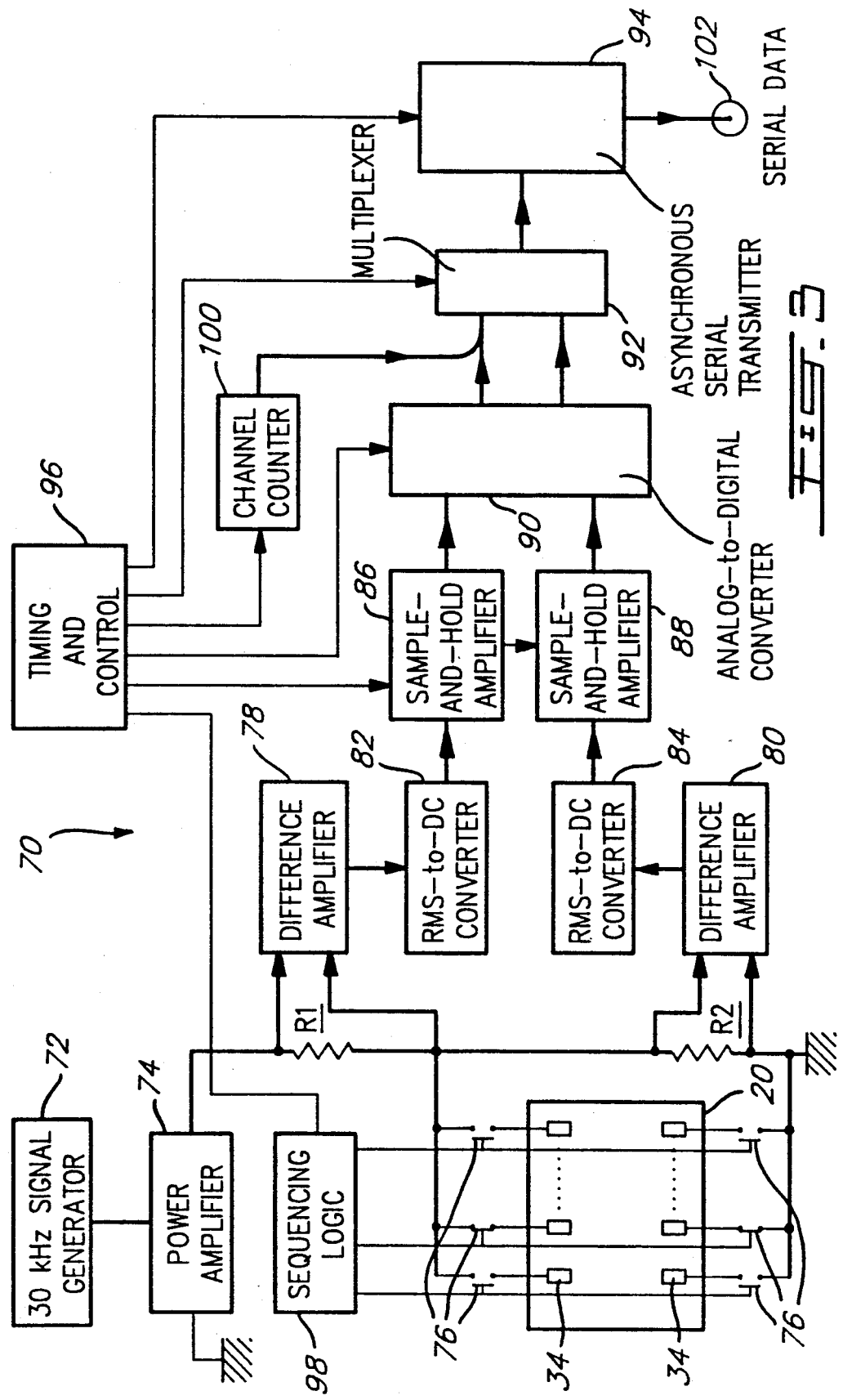
FIG. 3 shows, in block diagram form, a data aquisition and control system for use with the probe of the invention.
Figure 4A:
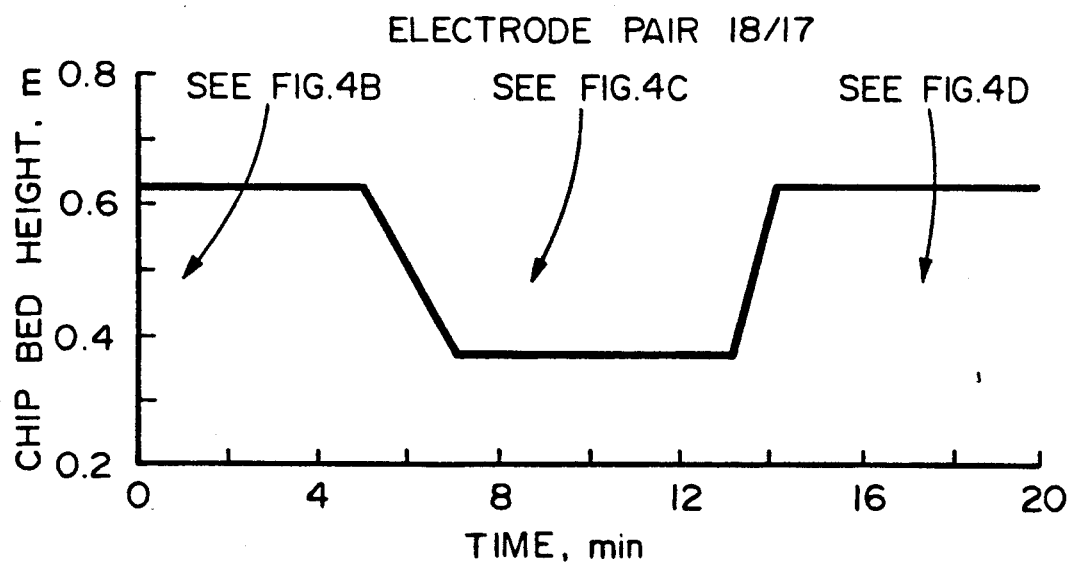
FIG. 4A shows a plot of typical signals from an electrode pair in the chip flow.
Figure 4B:
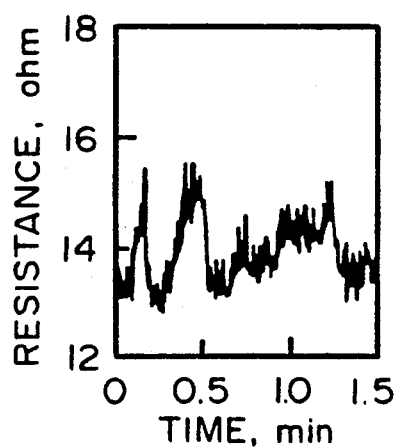
FIGS. 4B-4D and 5A-5P show a plot of the variation of electrical resistance with time in a test utilizing a probe of the invention.
Figure 4C:
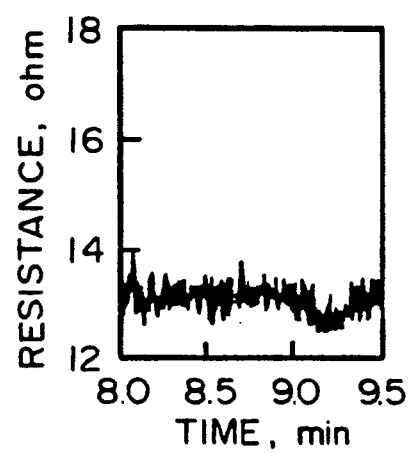
Figure 4D:
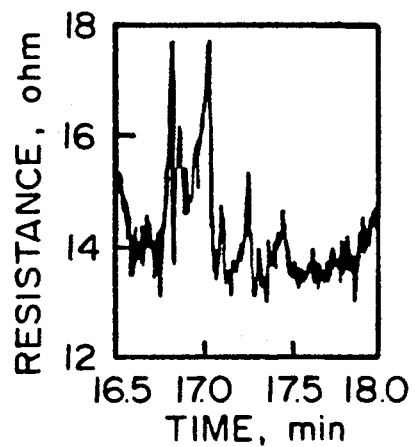
Figure 5A:
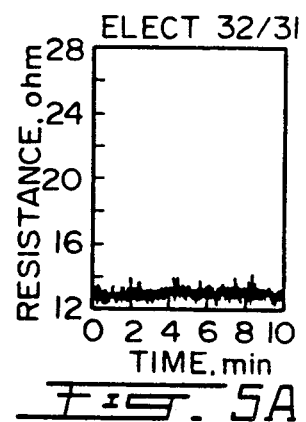
Figure 5B:
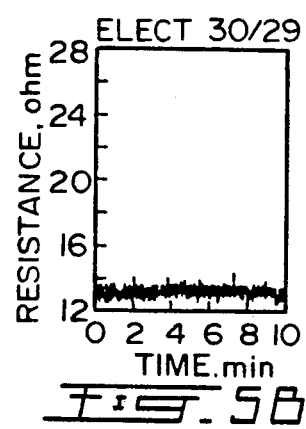
Figure 5C:
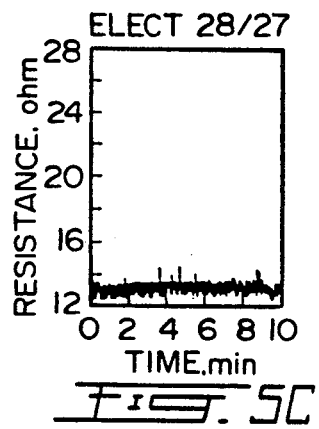
Figure 5D:
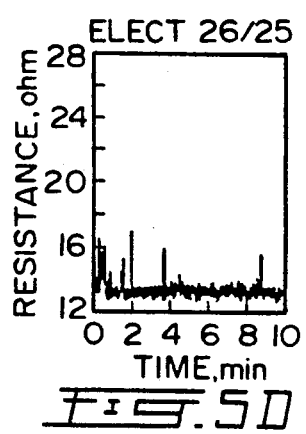
Figure 5E:
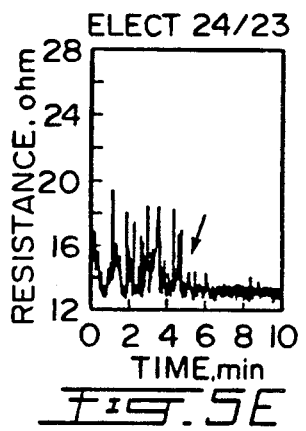
Figure 5F:
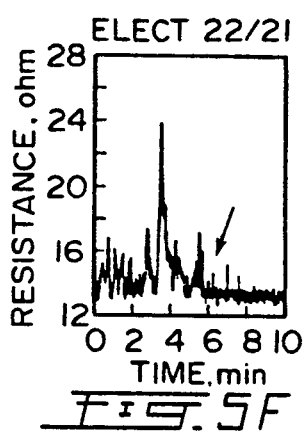
Figure 5G:
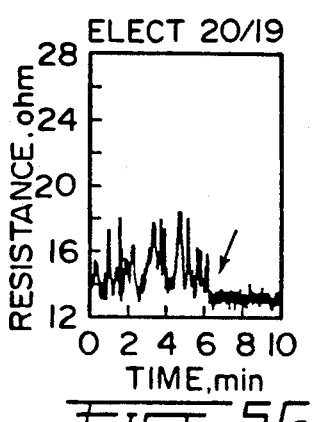
Figure 5H:
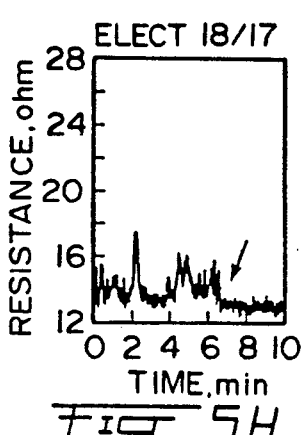

With further reference to FIG. 3, a data acquisition and control system 70 is electrically connected to the probe 20.

The data acquisition and control system 70 includes a signal generator 72, power amplifier 74 and FET switches 76.

Resistors R1 and R2 have respective difference amplifiers 78 and 80 and RMS-to-DC converters 82 and 84.

The system 70 further includes sample and hold amplifiers 86 and 88, an analog to digital convertor 90, a multiplexer 92 and an asynchronous serial transmitter 94.

The system 70 further includes a timing and control unit 96, a sequencing control 98 and a channel counter 100.

The asynchronous serial transmitter 94 connects to a serial data output 102.

In operation the probe 20 is vertically mounted in vessel 12 so that electrodes 34 are disposed in spaced apart vertical relationship within free-fall region 44 and bed region 46.

The flow simulator 10 was designed to provide chip flow regimes similar to those encountered in the top section of a continuous kraft digester such that the wood chips 48 in head box 14 fall through free-fall region 44 of vessel 12 at their terminal velocities until they reach the slow moving bed 50 of packed chips. The velocity of movement of bed 50 is determined mainly by the rate of chip removal from the bottom of vessel 12 into screw conveyor 16. In a particular operation the vessel 12 was filled with wood chips 48 to a desired level and a saturated sodium chloride solution was introduced to a level about 150 mm below the top of headbox 14. During operation, wood chips 48 extracted from the bottom of the vessel 12 by the screw conveyor 16 were entrained by the circulating brine (saturated sodium chloride solution) and conveyed through upflow conduit 28 to headbox 14. The screen 22 in head box 14 separates wood chips 48 from brine and retains them in wood chips/cooking liquor zone 21, while allowing the brine to pass into liquor zone 23.

The wood chips 48 in wood chips/cooking liquor zone 21 fall through the brine in free-fall region 44 and then to the bed 50.

The clear brine in liquor zone 23 is recycled through downflow conduit 24 to screw conveyor 16. The screen 26 in the inlet of downflow conduit 24 serves to remove any residual fine wood chips 48.

In a particular operation the screw conveyor 16 was operated at about 100 r.p.m. with drive 30 comprising a 3-phase AC motor with speed-reducing gears and pulleys.

The wood chips 48 were presteamed for maximum deaeration and were kept submerged in saturated sodium chloride solution at all times, and as such had a density slightly higher than that of the brine solution.

In the simulated tests brine was selected instead of white liquor for ease and safety in handling, and so as to maintain the integrity of the wood chips, since long-term exposure to white liquor would result in deterioration of the chips.

The electrical conductivity of brine which at 200 mS/cm is not as high as that of hot cooking liquor (800 mS/cm) is considered high enough to demonstrate the validity of the approach illustrated in the pilot scale chip flow simulator 10.

Figure 2:
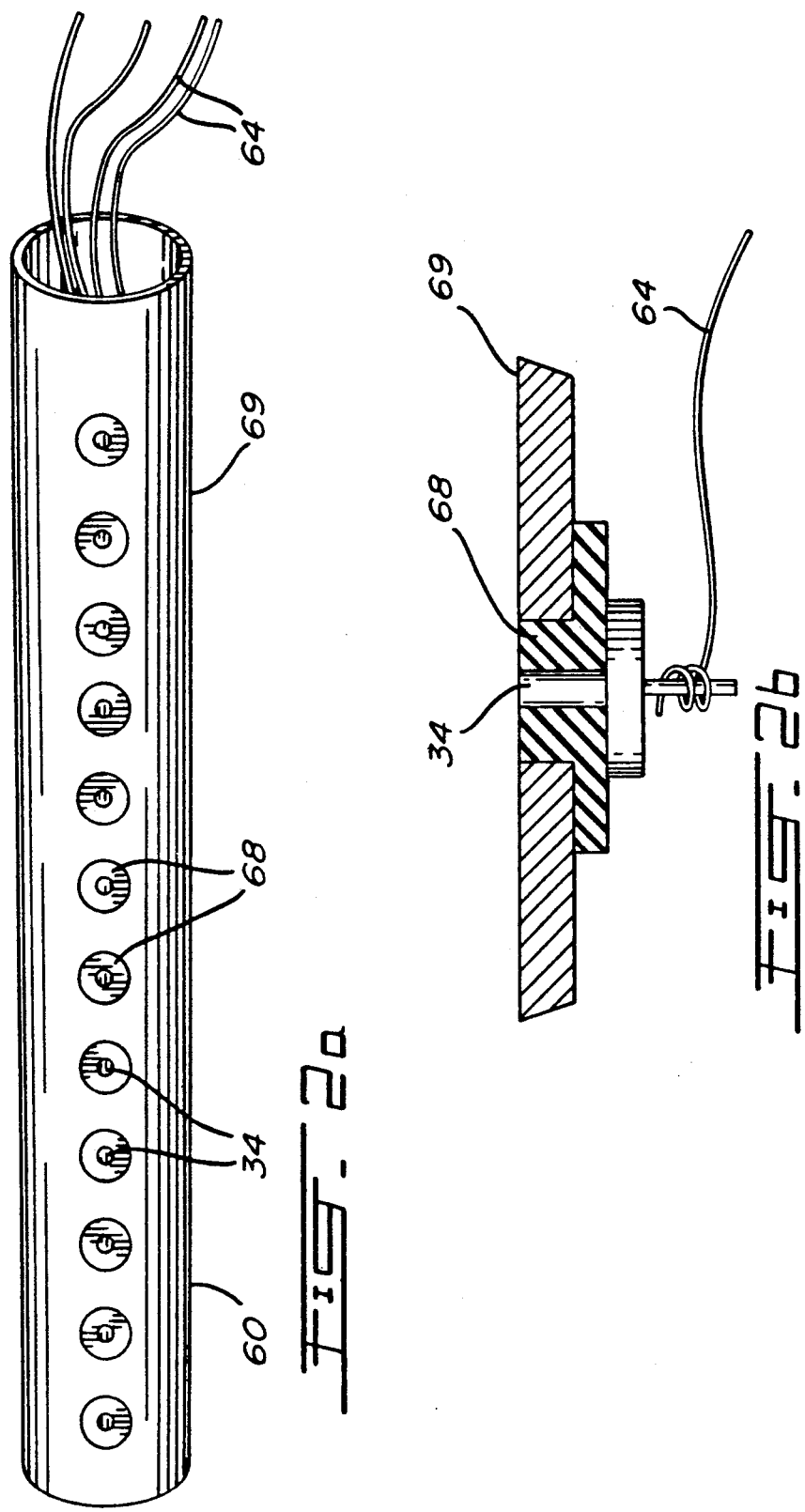
FIG. 2(a) is an external view of a sensor or probe of the invention.
FIG. 2(b) is a schematic cross-section illustrating a detail of the mounting of an electrode in the sensor or probe of FIG. 2(a)

Concerning the probe 20 illustrated in FIG. 2, the actual construction depends on several factors depending on the application and choice of operating parameters. The probe 20 employed in the simulator of FIG. 1 was in the form of a semi-circular plastic tube 90 mm in diameter and 2.2 m long. The probe was suspended vertically inside vessel 12 and had thirty-two brass electrodes 34, each 3 mm in diameter and spaced 25 mm apart, primarily embedded in the outer wall of the lower part of the probe 20 to give an active length of 0.8 m. The individual wires of the sets 64 and 66 were electrically insulated from one another. The points of contact between the electrodes 34 and the wires were covered with epoxy resin.

It will be recognized that the elongate hollow body 60 of the probe 20 is suitably cylindrical and completely sealed and of a material which will withstand the physical action of the moving wood chips 48.

The thirty-two electrodes were arranged in 16 pairs 62, with only one pair active at a time to avoid stray electrical currents between different electrode pairs 62. The active electrode pair 62 was connected in a circuit of known resistances and a voltage with a frequency of 30 kHz was applied across the circuit. The resistance, or more accurately, impedance, across the electrodes of the pair 62 was then calculated from the r.m.s. (root-mean-square) voltage drops across the different resistors.

The data acquisition and control system 70 illustrated in FIG. 3 more particularly consists of four sections. i) generation of voltage with a frequency of 30 kHz, ii) multiplexing of the electrode pairs, iii) r.m.s. to d.c. voltage conversion and quantization, and iv) data transmission. A low-power 30-kHz sinusoidal signal was first generated at generator 72 and its power boosted with a power amplifier 74 capable of delivering over 300 mA across a 16 ohm load. Two 10-ohm resistors ($R_1$ and $R_2$) were placed in series across the output of the power amplifier 74, and the active electrode pair was connected in parallel across the lower resistor ($R_2$) giving an equivalent impedance $Z_2$. With this arrangement the resistance seen by the power amplifier 74 could vary only between 10 ohm ($Z_2=0$, short-circuit across electrodes) and 20 ohm ($Z_2=10$ ohm, open-circuit across electrodes).

The electrodes were connected to the circuit via FET (field-effect-transistor) switches 76 which have an on-resistance of less than one ohm. A sequencing circuit 98 operating at 256 cycles/s activated one pair of switches 76 at a time while disabling the others, resulting in a scanning rate for the entire probe 20 of 16 times per second. During each electrode scan period of 1/256 s (or 3.9 ms), the a.c. voltage drops across $R_1$ and $R_2$ were converted to their r.m.s. equivalent and the resulting d.c. values ($V_1$ and $V_2$) passed through sample-and-hold amplifiers 86, 88 which kept their output constant for the next 3.9 ms during which the voltages were digitized by an analog-to-digital (A/D) converter 90. In other words, while part of the circuit was switching to a new electrode pair and acquiring the data, the A/D converter 90 was processing data from the previous electrode pair. To simplify data conversion and transmission, only $V_2$ was digitized with $V_1$ acting as the reference voltage to the A/D converter 90. With this scheme, the digital output of the A/D converter 90 was a value between zero and one representing the ratio of $V_2$ and $V_1$. Since $Z_2$ was always smaller than $R_1$, this ratio was guaranteed not to exceed one.

The digital output of the 12-bit A/D converter 90 was divided into two 8-bit words, with one word consisting of the lower 8 bits and the second word of the upper 4 bits plus a 4-bit electrode pair number. These 8-bit words were sent to an asynchronous serial transmitter 94 at equal intervals corresponding to a rate of 512 words/s. The use of the serial transmitter allowed direct interfacing to any computer equipped with a serial port. The timing and operation of the whole system, therefore, was continuous and independent of the host computer. The latter was used only to accumulate and analyze the data.

FIG. 4 shows typical signals from an electrode pair initially within the bed, then in the free-fall zone as the bed level decreased and then back within the bed as the chip bed was raised to its initial level. These signals consist of a baseline value determined by the liquor and circuit resistance plus a varying component caused by the presence of the chips. In general, electrodes above the chip bed gave signals with weak, high-frequency variations, while electrodes within the bed gave stronger and lower-frequency variations.

To convert the electrode resistance readings to chip level information, an estimate of some characteristic of the signal is necessary, which might require averaging over many readings. The block of data used in such averages is referred to as a "data window". The length of the window, naturally, has an effect on the final result. For this study, preliminary analysis showed that the window length should not be less than one minute, and no advantage was gained by using windows longer than 2 minutes. In the following analysis, the window length was at 1.5 minute, i.e., with a sampling rate of 4/s the window length was 360 points. A sliding window was used to update these averages, with the time difference between the start of each window being 2.5 seconds, i.e., an overlap of 350 points. Time averaging always results in an overall (group) delay of the estimate, equal to about one-half the window length. Increasing the window length, therefore, has two negative effects, one is to make the sensor more sluggish because of the increased averaging period, and the other, to add to the overall dead-time of the control loop.

There are many ways to analyze the electrode signals. One way of determining the wood chip level 52 is from the magnitude of the variation, or more specifically, the variance of the electrode resistance with time. Variance is defined as the average estimate of the square of the difference between the individual data points and their mean. One drawback of this method is that it relies on the absolute value of the resistance signal. Varying liquor conductivity or fouling of the electrode surface can cause changes in the resistance values independent of the chip flow regimes, and hence, make it difficult to define a universally valid variance level above which the existence of a chip bed can be known with certainty.

Comparison of the shapes of the electrode resistance signals, instead of their absolute values can avoid this difficulty. For meaningful comparisons, however, the data has to be normalized to a mean of zero and a variance of unity. This normalization is done on a window-by-window basis. Resistance signals above the bed were generally more random with higher frequency components than from electrodes within the chip bed. This would be expected since the chips move more slowly within the bed.

An auto-regressive model attempts to describe a signal in terms of its previous values, hence, an estimate of the signal at time n, y(n) is related to the past measured values $(x(n-1), x(n-2)$, etc.) by a simple linear relationship [11]:

$$y(n) = -a(1)\, x(n-1) - a(2)\, x(n-2) - \ldots - a(k)\, x(n-k)$$

where a(1) to a(k) are the model constants, and k the model order. The estimation error, e(n), therefore is:

$$e(n) = x(n) - y(n)$$

or $$e(n) = x(n) + a(1)\, x(n-1) + a(2)\, x(n-2) + \ldots + a(k)\, x(n-k).$$

The mean square value of the estimation error is a measure of the model accuracy. In general, as the model order is increased the estimation error should decrease and become more and more random, until it begins to represent white noise. At such point, the model constants contain all the information present in the original signal. For a unity-variance signal, the difference between the variance of the initial data and the final mean square value of the error is equivalent to the coefficient of determination ($r^2$), which has a value between zero and one. This coefficient can be taken as a measure of the randomness of the signal, with a value of one indicating a totally predictable signal.

EXAMPLES

Example 1

A pilot-scale apparatus was constructed to test the principle of operation of the chip level sensor. The apparatus consisted of a chip flow simulator and the experimental level probe illustrated in FIGS. 1, 2 and 3. The flow simulator was designed to provide chip flow regimes similar to those encountered in the top section of a continuous kraft digester, i.e., where chips fed at the top of the vessel fall freely at their terminal velocities until they reach the slow moving bed of packed chips. The velocity of this bed is determined mainly by the rate of chip removal from the bottom of the vessel.

In the chip flow simulator, shown schematically in FIG. 1, the vessel 12 was filled with chips 48 to the desired level, and the whole system was filled with saturated sodium chloride solution (brine) to a level about 150 mm below the top of the headbox 14. During operation, chips 48 extracted from the bottom of the vessel 12 with the screw conveyor 16 were entrained by the circulating brine and carried to the headbox 14. The screw conveyor 16 was operated at about 100 rpm using a 3-phase AC motor with speed-reducing gears and pulleys.

The wood chips 48 used were pre-steamed for maximum deaeration and were kept submerged in saturated sodium chloride solution at all times, and as such had a density slightly higher than that of the brine solution. Brine was selected instead of white liquor for two reasons: (i) safety and ease of handling, and (ii) to maintain the integrity of the wood chips since long-term exposure to white liquor would result in deterioration of the chips. The electrical conductivity of the brine (200 mS/cm), while not as high as that of hot cooking liquor (800 mS/cm), was assumed to be high enough to demonstrate the validity of the proposed approach.

At the maximum rpm, the feed rate of the screw conveyor 16 was about 19 L/min. With the vessel 12 diameter of 0.61 m. this rate translates to a linear bed velocity of 65 mm/min., which is well below the typical bed velocity in a continuous kraft digester of 150 mm/min. The cross-sectional area of the vessel 12, therefore, was reduced from 0.29 to 0.12 m², by placing four vertical baffles inside the vessel, which resulted in a bed velocity of about 160 mm/min.

The experimental level probe 20 described previously and shown in FIG. 2, was suspended vertically inside the vessel 12 and was fixed in place by clamping it to the top of the headbox 14 to align the lowest electrode 34 with the bottom of the cylindrical section of the vessel 12. The electrodes were numbered #1 to #32, with #1 being the lowest electrode.

Tests were carried out by circulating the chips 48 in the flow simulator 10 and recording the time variation of the electrical resistances across the sixteen electrode pairs 62. During some tests, the chip level 52 was changed by either adding or removing chips from the headbox 14 at a specific rate. The chip level 32 at the beginning and end of each test was measured with a "dipstick". The dipstick readings, however, were consistently 20 to 50 mm lower than the values deduced from the electrical resistance measurements. This discrepancy was probably caused by the dipstick pushing down the loosely-packed top layer of the chips in the bed.

Initially, the tests were one to two minutes long. Analysis of the data, however, showed that data windows spanning at least one minute were needed to characterize the chip flow regime, and therefore, testing for longer periods was necessary to establish the validity of the proposed measurement approach. This analysis also indicated that changes were relatively slow and little benefit was gained by sampling at a rate of 16 per second. In later tests, this was reduced to 4 samples per second per electrode by storing only every fourth probe scan sent by the data acquisition system.

A summary of the tests is given in Table I. In Test SM the level was held constant for the first 5 minutes, decreased during the next 2 minutes, held constant at the new level for another 6 minutes, increased during the following 1 minute back to the initial level, and held constant for the remainder of the test, as shown schematically in FIG. 4. In Test SC the level was held constant and in Tests SD and SU, the level was changed 2 minutes after starting the tests and was held constant during the last 1.5 minutes.

TABLE I

| Description of Test Conditions | | |
|---|---|---|
| Test | Duration | DESCRIPTION |
| SM | 20 min | Level decreased from electrode #20 to #10, then increased back to electrode #20 |
| SC | 15 min | Constant level at electrode #20 |
| SD | 15 min | Level decreased from electrode #20 to #10 |
| SU | 15 min | Level increased from elecrode #10 to #20 |

Plots of the variation of the electrical resistance with time for the first 10 minutes of Test SM are shown in FIG. 5. The baseline resistances during Test SM was about 12.5 ohms. The plots show that as the chip bed level began to decrease, the variation of the resistance across the electrode pairs changed from high-level to low-level, starting with electrode pair #24/#23 at time=5 minutes and reaching electrode pair #4/#13 4 minutes later (FIG. 5), as indicated by the arrows. The determination of the point of transition between the two signal modes is not always possible from examination of the time plots alone.

Figures 6A, 6B, 6C, 6D, 6E, 6F, 6G, 6H:
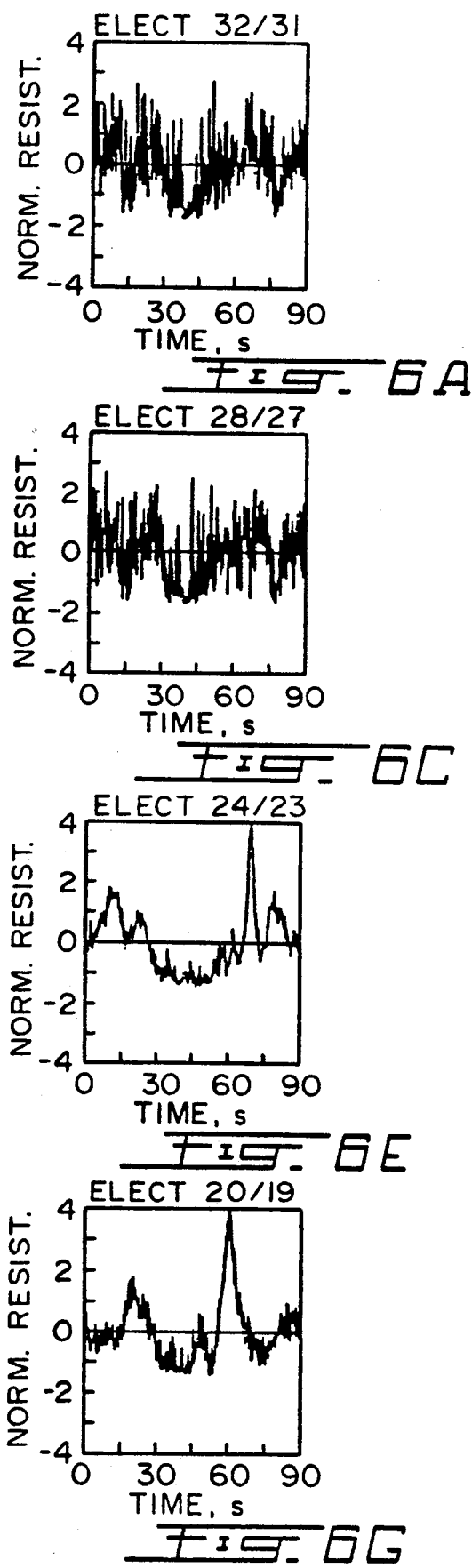

To use the auto-regressive model the data is first normalized to a mean of zero and a variance of unity. FIG. 6 shows the normalized data over a period of one window (1.5 minutes) for test SM.

The auto-regressive model method is applied to the data and the equivalent coefficient of determination ($r^2$) is calculated. FIG. 7 shows the variation of $r^2$ with time for the sixteen electrode pairs for Test SM. The values of $r^2$ were less than 0.2 for the upper electrodes, and generally above 0.8 for electrodes in the chip bed. The transition from high to low $r^2$ after time=5 minutes can be seen for electrode pairs #24/#23 to #16/#15 (FIG. 7). By defining the chip bed interface as the position of the highest electrode pair with $r^2$ values larger than 0.5, a plot of the bed height variation with time can be obtained as shown in FIG. 8.

Figure 8:
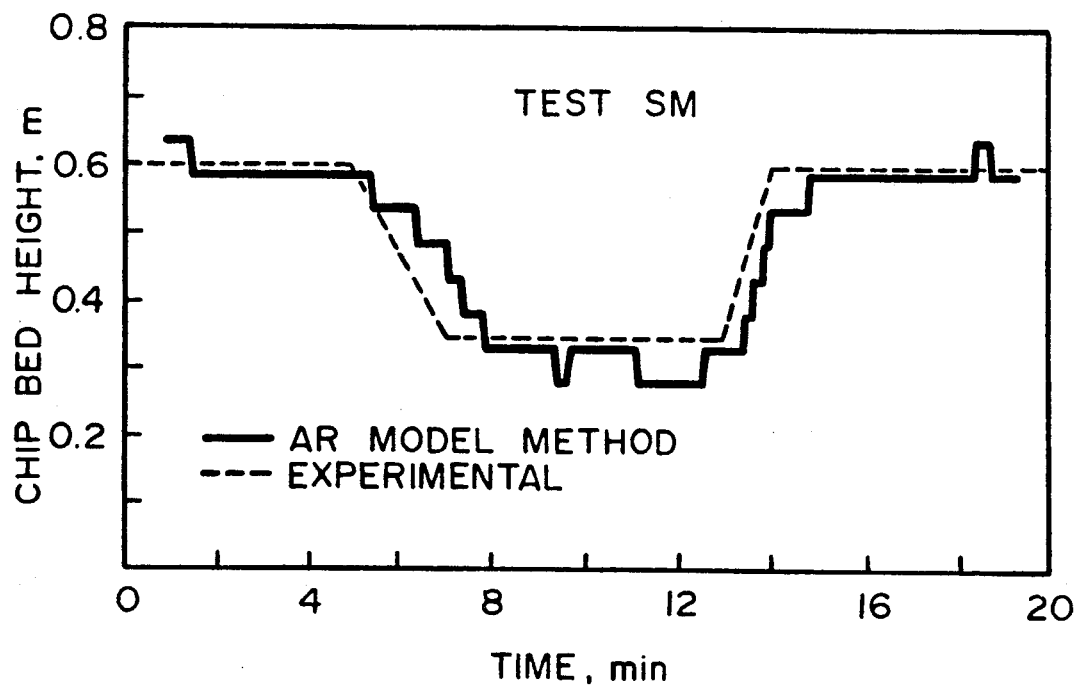
FIG. 8 is a plot of wood chip bed height variation with time for the same test as FIG. 5.
Figure 9:
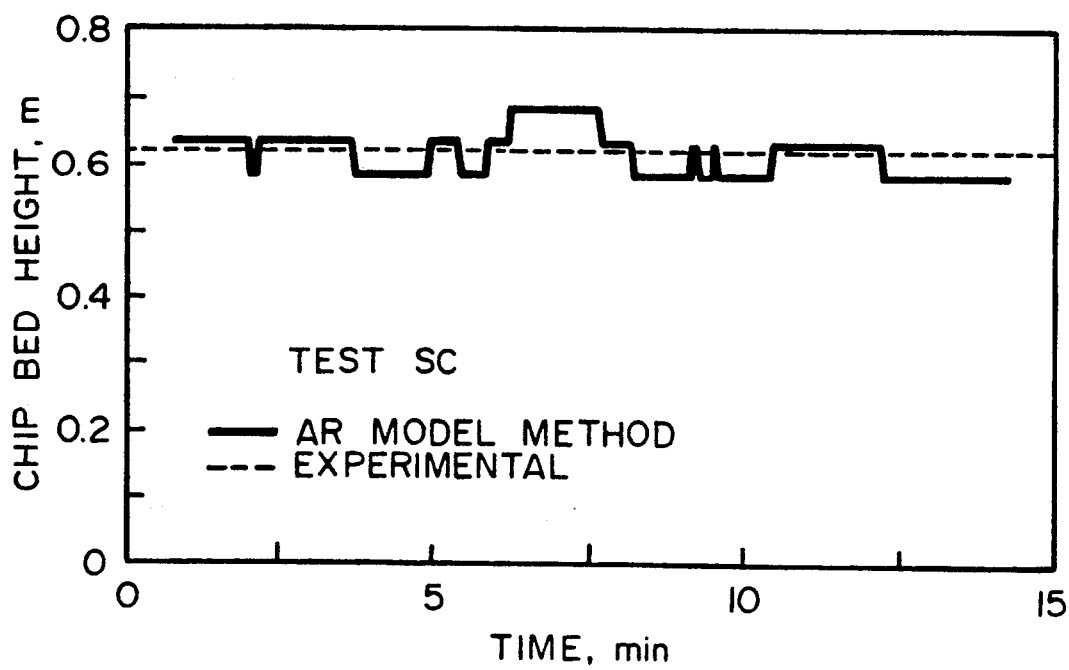
FIGS. 9 to 11 are plots similar to FIG. 8 for other tests.
Figure 10:
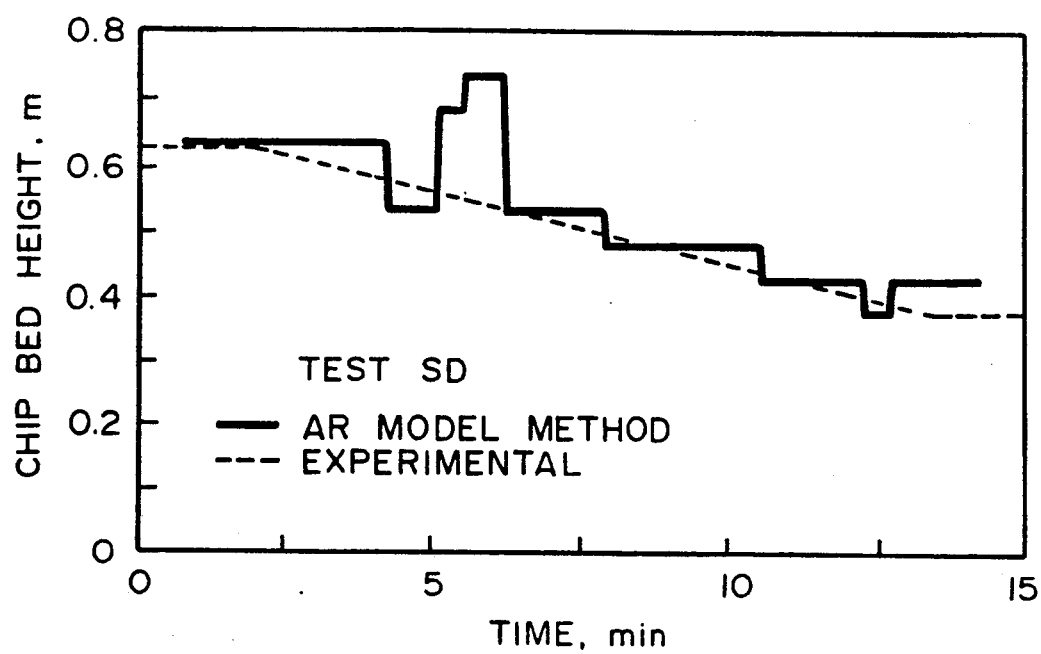
Figure 11:
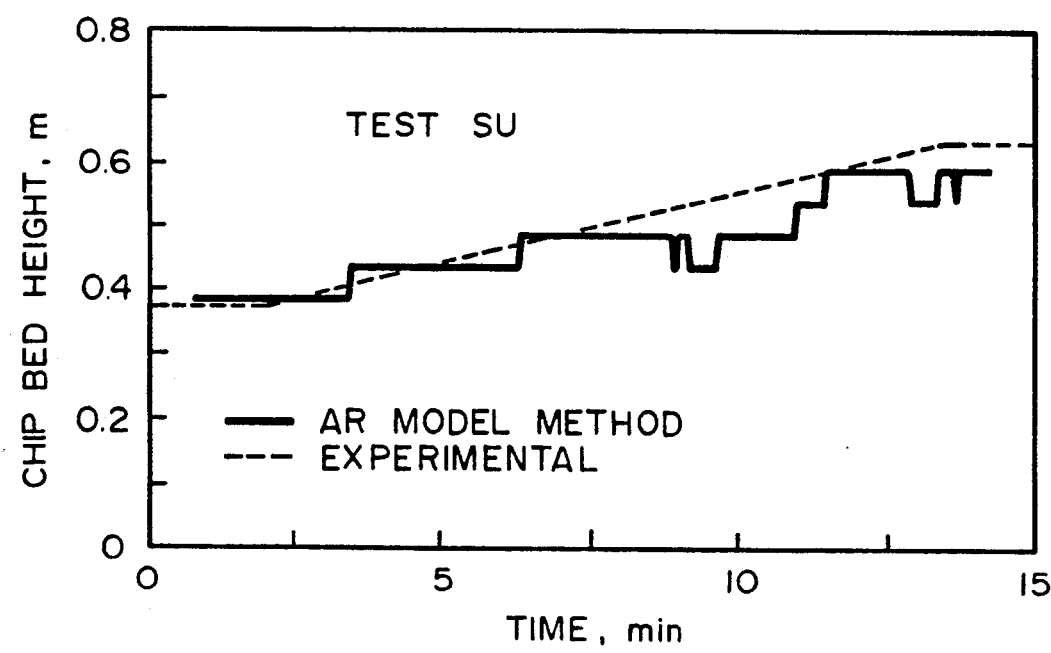

FIGS. 9 to 11 show plots similar to FIG. 8 for the three other tests described in Table I. The dotted lines in these plots indicate the approximate chip bed level during the tests, based on chip removal and addition rates. Again, with a window length of 90 seconds, the average delay in the calculated chip level was about 45 seconds. These plots show that the auto-regressive model method can be used to estimate the chip level, with the added benefit of not relying on the absolute value of the resistance signal.

EXAMPLE 2

Tests with White Liquor

Small-scale tests were carried out using white liquor instead of brine. The experimental apparatus consisted of a pair of electrodes placed in a 1 liter beaker containing hot (70°–80° C.) white liquor with different amounts of wood chips. The electrodes, which were made of stainless steel rods embedded in a block of Teflon (Trade Mark for polytetrafluoroethylene), were connected to the data acquisition system described above with reference to FIG. 3. The chips were pre-steamed and soaked initially in water and later in cold white liquor. In two tests a small amount of chips were placed in the beaker, and the electrical resistance was measured while stirring the chips intermittently in front of the electrodes to simulate the free-fall flow regime. In two other tests enough chips were added to submerge the electrodes completely, and the resistance was measured while moving the electrode pair slowly to simulate the slow-moving chip bed. Each test lasted 2 minutes.

The data from the four tests were analyzed using the auto-regressive model method. The baseline resistance was about 35 ohm which is significantly higher than the 12 ohm value observed with the brass electrodes in saturated brine. The values of the coefficient of determination ($r^2$), however, were more in line with the pilot-scale tests, namely, 0.28 and 0.44 for the loose chips tests and 0.74 and 0.78 for tests with the packed chips. In other words, changes in the electrical characteristics of the electrode reactions and the conductivity of the electrolyte was not detrimental to the technique.

We claim:

1. A method of detecting the wood chip level in a downwardly moving flow of wood chips having an upper stream of free falling wood chips and a lower bed of wood chips, in a cooking liquor, comprising:
supporting a sensor in said downwardly moving flow, said sensor comprising:

an elongate housing having an upper end and a lower end, said elongate housing extending vertically of said downwardly moving flow, a multiplicity of electrodes on an outer surface of said elongate housing, in spaced apart relationship along at least a portion of the longitudinal length of said housing, said electrodes being disposed at different levels of said downwardly moving flow, said electrodes forming a plurality of pairs of electrodes in which each pair is associated with a different level of said flow, a plurality of electrically conductive wires within said housing, each wire being in electrical contact with an electrode of said multiplicity of electrodes, said electrically conductive wires being electrically insulated one from another and selectively electrically connecting said plurality of pairs to a source of electrical current to develop a flow of electric current between said pairs at said different levels, at least some of said electrodes being at levels within said upper stream and some being at levels within said bed, allowing electrical current to flow in a current path between said pairs of electrodes at a plurality of said different levels, evaluating the electrical impedance of the current path as a measure of the state of wood chip flow between the electrodes of a said pair, and determining the wood chip level of the bed from the state of wood chip flow at said plurality of different levels.

2. A method of claim 1, wherein said downwardly moving flow is in a continuous kraft pulp digester or impregnation vessel.

3. A method of claim 1, wherein said downwardly moving flow is in a continuous kraft pulp digester.

4. A method of claim 3, wherein said evaluating comprises sequentially measuring an electrical impedance at each of said pair of electrodes, converting the sequentially generated electrical impedances to corresponding direct current voltages, digitizing said direct current voltages and analyzing said digitized voltages.

5. A method of detecting the particle level in a downwardly moving flow of particles, having an upper stream of settling particles and a lower bed of particles in an electrically conductive liquid medium in a clarification zone of a clarifier for separating said particles from said liquid medium by settling of said particles, whereby the extent of clarification of the liquid medium by settling of the particles can be determined, comprising:

supporting a sensor in said downwardly moving flow, said sensor comprising:

an elongate housing having an upper end and a lower end, said elongate housing extending vertically of said downwardly moving flow, a multiplicity of electrodes on an outer surface of said elongate housing, in spaced apart relationship along at least a portion of the longitudinal length of said housing, said electrodes being disposed at different levels of said downwardly moving flow, said electrodes forming a plurality of pairs of electrodes in which each pair is associated with a different level of said flow, a plurality of electrically conductive wires within said housing, each wire being in electrical contact with an electrode of said multiplicity of electrodes, said electrically conductive wires being electrically insulated one from another and selectively electrically connecting said plurality of pairs to a source of electric current to develop a flow of electric current between said pairs at said different levels, at least some of said electrodes being at levels within said upper stream and some being at levels within said lower bed, allowing electrical current to flow in a current path between said pairs of electrodes at a plurality of said different levels of said flow, evaluating the electrical impedance of the current path as a measure of the state of particle flow between the electrodes of a said pair, and determining the particle level of the bed from the state of particle flow at said plurality of different levels.

* * * * *